Sept. 8, 1964   J. V. BARNES   3,147,825
AUTOMOTIVE BRAKE HAVING SERVO ASSIST FLUID DISTRIBUTING MEANS
Filed Dec. 6, 1961   2 Sheets-Sheet 1

JOHN V. BARNES
INVENTOR.

BY John R. Faulkner
Clifford L. Sadler

ATTORNEYS

Sept. 8, 1964        J. V. BARNES        3,147,825
AUTOMOTIVE BRAKE HAVING SERVO ASSIST FLUID DISTRIBUTING MEANS
Filed Dec. 6, 1961        2 Sheets-Sheet 2

JOHN V. BARNES
INVENTOR.

BY *John C. Faulkner*
*Clifford L. Sadler*

ATTORNEYS

United States Patent Office 3,147,825
Patented Sept. 8, 1964

3,147,825
AUTOMOTIVE BRAKE HAVING SERVO ASSIST FLUID DISTRIBUTING MEANS
John V. Barnes, Detroit, Mich., assignor to Ford Motor Company, Dearborn, Mich., a corporation of Delaware
Filed Dec. 6, 1961, Ser. No. 157,451
2 Claims. (Cl. 188—78)

This invention relates to automotive brake assemblies that provide full servo energization of the entire brake lining.

Various brake constructions and power booster systems have been utilized in an attempt to obtain a large braking force from a small brake pedal effort. The duo servo brake represents one approach to this problem.

The duo servo brake uses the friction force generated between the brake linings and the drum to produce a self-actuating force upon the brake shoes. The primary brake shoe is permitted to rotate slightly in the direction of drum rotation and the force exerted upon the primary shoe is transferred as a servo assist for the actuation of the secondary shoe by a link interposed between the lower ends of the shoes. The abutment of the upper end of the secondary shoe with the fixed anchor pin of the conventional duo servo brake, however, prevents a like transfer of force from the secondary shoe to the primary shoe. This type of brake, therefore, is not a true full servo brake.

It is an object of this invention to obtain high braking forces with low pedal effort through the use of a full servo brake assembly.

In a brake embodying this invention, a frictional lining is supported in face to face relationship with the internal surface of a rotatable drum. A force applying means is interposed between spaced ends of the lining. The force applying means includes hydraulic force transmitting elements that exert hydraulic servo assist from one shoe end to the other. The force applying means also acts as an anchor for the brake shoes.

Because of the full servo effect permitted by this invention, the greater strength and wear properties of lining materials having low coefficients of friction may be utilized without a loss of braking ability. This results in a brake that possess uniform brake characteristics under varying loads and also has a long lining life.

Further objects and advantages of this invention will become more apparent as this description proceeds particularly when considered in conjunction with the accompanying drawings, wherein.

Figure 1:
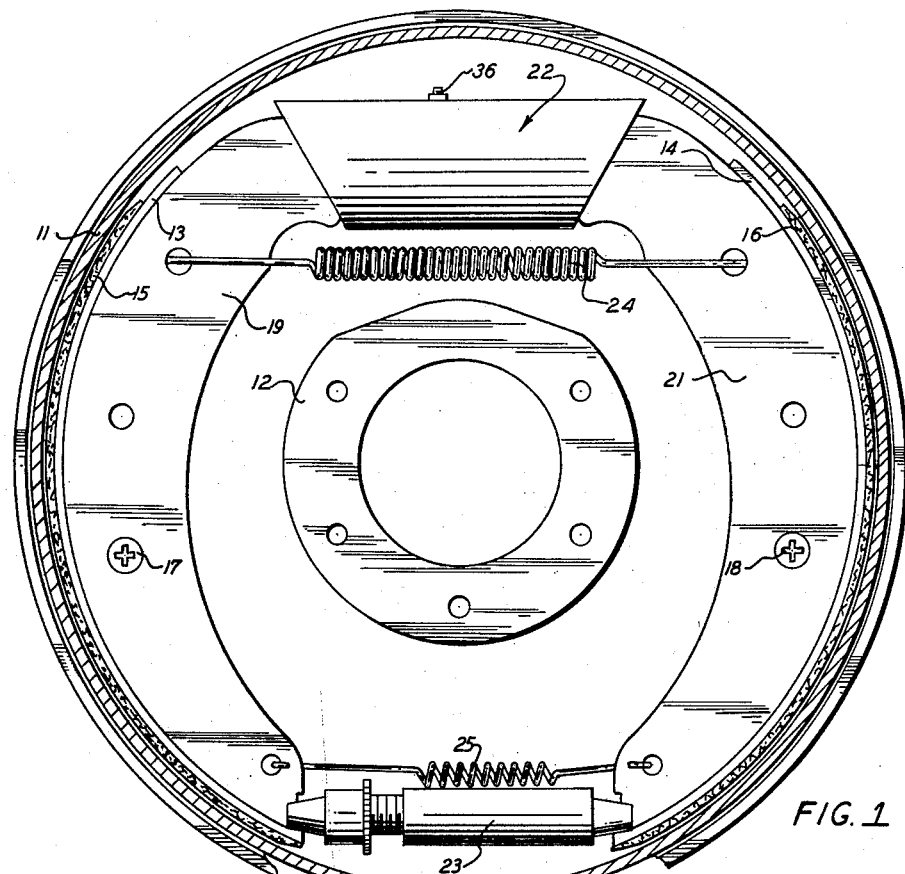
FIGURE 1 is an elevational view partly in cross section of an automotive brake assembly embodying the instant invention.

Referring now in detail to the drawings and in particular to FIGURE 1, there is shown generally at 11 a rotatable brake drum. Supported within the brake drum 11 on a stationary backing plate 12 are a primary brake shoe 13 and a secondary brake shoe 14. Frictional linings 15 and 16 are riveted or otherwise secured to the brake shoes 13 and 14, respectively, in face to face relationship with the internal surface of the brake drum 11. Steady rest spring assemblies 17 and 18 bear against reinforcing webs 19 and 21 of the shoes 13 and 14, respectively, to urge the shoes into contact with the backing plate 12.

A hydraulically actuated wheel cylinder assembly 22 is interposed between the upper ends of the webs 19 and 21 for causing the frictional linings 15 and 16 to move into engagement with the internal surface of the drum 11. A threaded transfer link 23 is interposed between the lower ends of the webs 19 and 21. The transfer link 23 functions to transmit servo forces from one shoe to the other during brake actuating in a manner which will become more apparent as this description proceeds. The transfer link 23 has an adjustable length to permit the steady rest position of the shoes 13 and 14 to be varied to compensate for wear of the frictional linings 15 and 16.

A tension spring 24 is connected between the upper ends of the webs 19 and 21. A similar tension spring 25 is connected between the lower ends of the webs 19 and 21. The tension springs 24 and 25 serve to retract the shoes 13 and 14 when the brake is not energized and to maintain the ends of the webs 19 and 21 in contact with the wheel cylinder 22 and the transfer link 23.

In addition to actuating the shoes 13 and 14, the wheel cylinder 22 functions as an anchor or reaction member for the shoes 13 and 14. Further, it transfers a portion of the servo forces from one shoe to the other during brake operation. The construction which makes these functions possible may be best understood with reference to FIGURES 3 and 4 wherein the cylinder 22 is shown in cross section.

The wheel cylinder 22 includes a cylindrical housing 26 that is rigidly secured to the backing plate 12 in some suitable manner. The housing 26 has first and second hydraulic chambers 27 and 28 formed therein. Pistons 29 and 31 are reciprocally received in the chambers 27 and 28. The outer heads of the pistons 29 and 31 are formed with arcuate recesses 32 and 33 which receive the arcuate ends of the reinforcing webs 19 and 21. As has been noted, the tension spring 24 urges the reinforcing webs 19 and 21 into contact with the pistons 29 and 31.

A cylindrical bore 34 is formed within the housing 26 between the chambers 27 and 28. A floating seal 35 separates the chambers 27 and 28 and prevents hydraulic flow therebetween. Hydraulic fluid may flow from a master cylinder (not shown) into a hydraulic fitting 36 and through T-shaped passage 37 formed in the housing 26 to the chambers 27 and 28. The ends 38 and 39 of the T-shaped passage 37 open into the chambers 27 and 28, respectively.

Disc valves 40 and 41 are slidably received on stems 42 and 43 of the pistons 29 and 31. Resilient seals 44 and 45 are secured to the valves 40 and 41. The disc valves 40 and 41 are positioned axially on the stems 42 and 43 by coil springs 46 and 47 and snap rings 48 and 49. The springs 46 and 47 act between the pistons 29 and 31 and disc valves 40 and 41 to urge the disc valves 40 and 41 into contact with snap rings 48 and 49. The resilient seals 44 and 45 of the disc valves 40 and 41 are adapted to seal the open ends 38 and 39 of the T-shaped passage 37.

*Operation*

Figure 2:
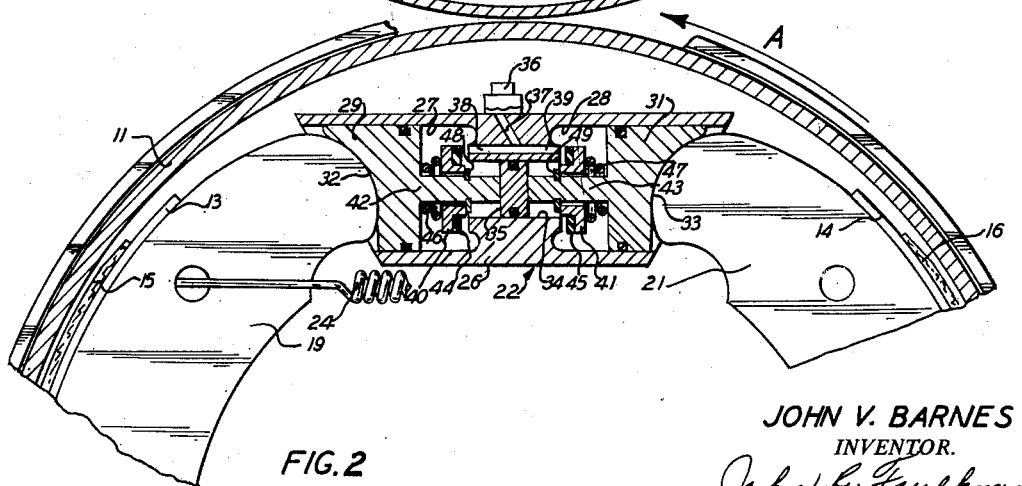
FIGURE 2 is a partial cross sectional view in elevation showing the upper portion of the assembly shown in FIGURE 1.

The brake shoes 13 and 14 are shown in the retracted position in FIGURE 2 and arrow A indicates the direction of rotation of the drum 11 when the vehicle is moving in a forward direction. In the retracted position (FIGURE 2), the tension springs 24 and 25 hold the webs 19 and 21 in contact with the pistons 29 and 31 and the transfer link 23. The fluid in chambers 27 and 28 is not under pressure and the stems 42 and 43 of pistons 29 and 31 bear against the floating seal 35 and center it in the bore 34. The disc valves 40 and 41 are spaced from the open ends 38 and 39 and will permit hydraulic fluid under pressure to enter the chambers 27 and 28 when the master cylinder is energized.

Figure 3:
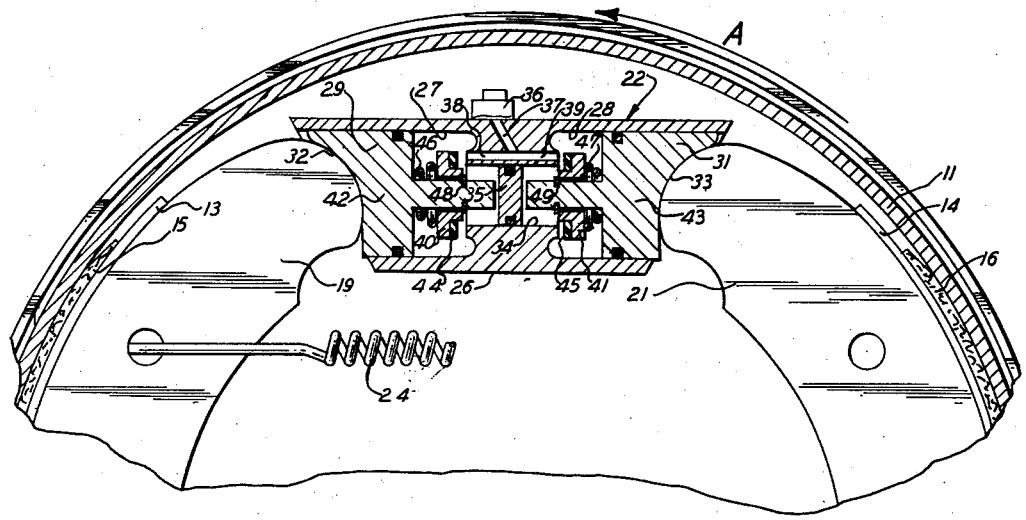
FIGURE 3 is an elevational view corresponding to FIGURE 2 showing the brake assembly at the beginning of its actuation.

Upon energization of the master cylinder, hydraulic fluid under pressure enters the wheel cylinder 22 through the fitting 36 and T-shaped passage 38. The hydraulic fluid flows through open ends 38 and 39 into the chambers 27 and 28 to urge the pistons 29 and 31 outwardly (FIGURE 3). As the pistons 29 and 31 separate and act against the reinforcing webs 19 and 21, the linings 15 and 16 are moved into engagement with the internal surface of the drum 11. The inner ends of the stem 42 and 43 then move away from the movable seal 35.

Figure 4:
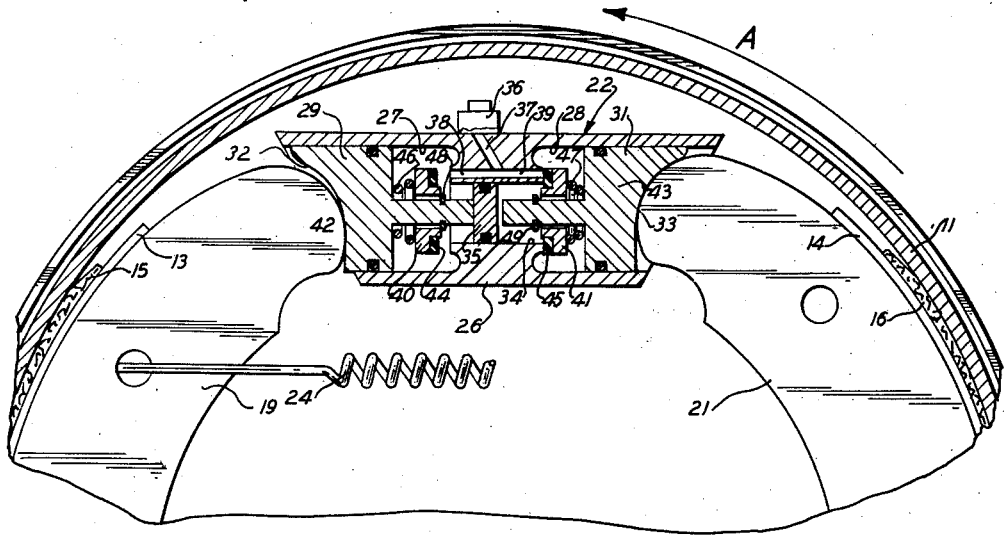
FIGURE 4 is a view similar to FIGURE 2 showing the brake after it has been actuated.

Upon engagement of the linings 15 and 16 with the internal surface of the drum 11, the brake shoes 13 and 14 rotate slightly in the direction of drum rotation (FIGURE 4). The primary shoe 13 additionally tends to rotate about the point at which the lower end of its reinforcing web 19 contacts the transfer link 23. This creates a self-actuation force upon the lining 15 of the primary shoe 13. The actuation force exerted upon the primary shoe 13 by the wheel cylinder 22 and the self-actuation force are exerted by the transfer links 23 as a servo actuation force upon the lower end of the reinforcing web 21 of the secondary shoe 14. The lower end of the secondary shoe 14 tends to rotate about the piston 31 into contact with the drum 11. This provides an additional actuating assist upon the secondary shoe 14.

The rotation of the shoes 13 and 14 in the direction of rotation of the drum 11 causes the pistons 29 and 31 to move to the left as seen in FIGURE 4. Movement of the piston 31 to the left causes the resilient seal 45 of the disc valve 41 to move into contact with the open end 39 and shut off the flow of hydraulic fluid into the chamber 28. This creates a hydraulic lock in the chamber 28. Continued displacement of fluid from the master cylinder will be diverted entirely to the chamber 27 of wheel cylinder 22.

The hydraulic lock created in the chamber 28 is utilized to provide an anchor for the brake assembly and also to transmit a portion of the torque on the secondary shoe 14 as a servo assist to the primary shoe 13. This is accomplished in the manner now to be described. As the brake shoes 13 and 14 continue to rotate, a rise in pressure in the chamber 28 occurs. The annular part of the housing 26 between its outer bore and the inner bore 34 forms a head against which a portion of the hydraulic pressure on the piston 31 acts. This provides a stationary reaction member for the brake assembly.

The hydraulic fluid in chamber 28 may communicate with the bore 34 through a clearance that exists between the disc valve 41 and the stem 43. The pressure in the bore 34 is substantially the same as the pressure in chamber 28 and this pressure acts against the right-hand face of the movable seal 35. This pressure acting on the movable seal 35 causes it to move to the left and abut the stem 43 of the piston 29. This force on a primary shoe 13 assists in its actuation.

It may be seen that this construction permits the wheel cylinder 22 to function as an anchor for the brake assembly and also allows a transfer of force from the secondary shoe 14 to the primary shoe 13. The ratio between the force that is transmitted through the housing 26 to the stationary backing plate 12 and the force transfer through the movable seal 35 to the primary piston 29 may be varied by changing the respective diameters of the pistons 29 and 31 and the movable seal 35.

When the brake is released, the tension springs 24 and 25 will return the system to the equilibrium position shown in FIGURES 1 and 2. Although the operation has been described assuming the vehicle to be traveling in a forward direction resulting in counterclockwise revolution of the drum 11, the device will be equally effective when the vehicle is moving in a rearward direction. This is possible because of the symmetry of the construction.

It is to be understood that the invention is not to be limited to the exact construction shown and described, but that various changes may be made within the scope of the invention as defined by the appended claims.

I claim:

1. In a self-energizing brake, a rotatable drum, a frictional lining movably supported within said drum in face to face relationship with the internal surface of said drum, said frictional lining having spaced adjacent ends, a first piston in engagement with one of said ends, a first hydraulic chamber in which said first piston reciprocates, a second piston in engagement with the other of said ends, a second hydraulic chamber in which said second piston reciprocates, fluid pressure means communicating with said chambers for exerting fluid pressure on said pistons for causing said lining to move into engagement with said drum, valve means blocking the flow of fluid pressure to said first chamber upon the transfer of brake torque from said one of said ends to said first piston whereby a fluid pressure build-up occurs in said first hydraulic chamber and the entire pressure of said fluid pressure means is directed to said second hydraulic chamber, and force transmitting means for transferring a portion of the force of the fluid pressure build-up in said first chamber to said second piston.

2. In a self-energizing brake; a rotatable drum; a frictional lining movably supported within said drum in face to face relation with the internal surface of said drum; said frictional lining having spaced adjacent ends; hydraulic force applying means associated with each of said ends; each of said hydraulic force applying means consisting of a fluid chamber, a piston reciprocally received in said chamber in engagement with said end, conduit means communicating fluid flow to said chamber and valve means carried by said piston cooperating with said conduit means to shut off fluid flow to said chamber after said piston moves into said chamber a predetermined distance, said valve means permitting continued movement of said piston into said chamber after said valve means closes said conduit whereby a fluid pressure rise occurs in said chamber; and force transfer means for transferring the force created by the rise of fluid pressure in one of said chambers to the other of said pistons.

References Cited in the file of this patent

UNITED STATES PATENTS

| | | |
|---|---|---|
| 2,382,268 | Stelzer | Aug. 14, 1945 |
| 2,385,168 | Stelzer | Sept. 18, 1945 |
| 2,997,139 | Brisson | Aug. 22, 1961 |